United States Patent [19]

Mueller

[11] Patent Number: 5,681,627
[45] Date of Patent: Oct. 28, 1997

[54] HIGHLY FLEXIBLE MULTILAYER FILMS FOR VARIOUS MEDICAL APPLICATIONS

[75] Inventor: Walter B. Mueller, Inman, S.C.

[73] Assignee: W. R. Grace & Co.-Conn., Duncan, S.C.

[21] Appl. No.: 505,435

[22] Filed: Jul. 21, 1995

[51] Int. Cl.⁶ .................. B32B 27/40; A61F 5/44
[52] U.S. Cl. .............. 428/35.2; 428/35.4; 428/36.8; 428/220; 428/423.3; 428/424.2; 428/424.8; 428/516; 428/517; 428/518; 604/327; 604/332; 604/408
[58] Field of Search ............... 428/35.2, 35.4, 428/35.7, 36.6, 36.7, 423.1, 424.2, 424.8, 412, 520, 516, 518, 423.3, 519, 517, 220, 36.8; 604/403, 408, 327, 332

[56] References Cited

U.S. PATENT DOCUMENTS

| | | | |
|---|---|---|---|
| 4,296,156 | 10/1981 | Lustig et al. | 428/518 |
| 4,623,587 | 11/1986 | Ito et al. | 428/516 |
| 4,654,240 | 3/1987 | Johnston | 428/518 |
| 4,828,891 | 5/1989 | Lustig et al. | 428/518 |
| 4,830,918 | 5/1989 | Schinkel et al. | 428/349 |
| 4,837,047 | 6/1989 | Sato et al. | 428/35.2 |
| 4,981,737 | 1/1991 | Rico | 428/40 |
| 5,093,164 | 3/1992 | Bauer et al. | 428/35.4 |
| 5,395,681 | 3/1995 | Hargarter et al. | 428/35.2 |

FOREIGN PATENT DOCUMENTS

| | | |
|---|---|---|
| 4022741 | 1/1992 | Germany. |
| WO95/07816 | 3/1995 | WIPO. |
| WO95/07817 | 3/1995 | WIPO. |

*Primary Examiner*—Rena Dye
*Attorney, Agent, or Firm*—Thomas C. Lagaly

[57] ABSTRACT

A multilayer film generally includes a first exterior layer of polyurethane and a second exterior layer which can be formed from polyurethane, a homopolymer or copolymer of polypropylene, a blend of homopolymer or copolymer of polypropylene and elastomer, high density polyethylene, or mixtures of the foregoing. Such multilayer film is highly flexible and is advantageously used for various medical applications, such as the production of flexible pouches for the packaging and administration of medical solutions, drainage pouches, compression devices, and thermal blankets.

21 Claims, 1 Drawing Sheet

HIGHLY FLEXIBLE MULTILAYER FILMS FOR VARIOUS MEDICAL APPLICATIONS

BACKGROUND OF THE INVENTION

The present invention relates to multilayer films and, more particularly, to multilayer films which are highly flexible yet strong such that they are suitable for various medical applications.

Currently, it is common medical practice to supply medical solutions for parenteral (e.g., intravenous) administration in the form of disposible, flexible pouches. One class of such pouches is commonly referred to as an "I.V. bag." These pouches must meet a number of performance criteria, including collapsibility, optical clarity and transparency, high-temperature heat-resistance, and sufficient mechanical strength to withstand the rigors of the use environment. Medical solution pouches must also provide a sufficient barrier to the passage of moisture vapor and other gasses to prevent contamination of the solution contained therein.

Collapsibility is necessary in order to ensure proper and complete drainage of the pouch. Unlike rigid liquid containers which rely on air displacement for drainage, medical solution pouches rely on collapsibility for drainage. As the pouch drains, atmospheric pressure collapses the pouch at a rate which is proportional to the rate of drainage. In this manner, the pouch can be fully drained and at a substantially constant rate. In order for the pouch to be collapsible, the film from which the pouch is made must be flexible. If the film is too stiff, the pouch cannot drain fully and, as a result, the patient may not receive the intended quantity of medical solution. Thus, a key consideration in the design of films used to produce medical solution pouches is that the film must have sufficient flexibility that the resultant medical pouch is collapsible enough to be fully drainable.

Prior to administering a medical solution from a pouch and into a patient, a visual inspection of the solution contained within the pouch is performed by the medical professional who is performing the administration procedure. Such an inspection provides a cursory determination that the medical solution to be administered is of the proper type and has not deteriorated or become contaminated. In this regard, it is essential that the pouch have excellent optical properties, i.e., a high degree of clarity and transmission and a low degree of haze. A medical solution pouch having poor optical properties can easily render a visual inspection of the packaged solution ineffective, thereby causing the medical professional to needlessly discard the pouch. Worse, the medical professional could fail to notice a solution which is of the wrong type, or which had deteriorated or become contaminated.

Solution-containing medical pouches are typically sterilized by the manufacturer and/or packager of the medical solution prior to sending the packaged medical solution to the end user, e.g., a hospital. This helps to ensure that the medical solution, as packaged in the medical solution pouch, will be substantially free from contamination. Thus, another requirement of medical solution pouches is that they must be able to endure the conditions which are encountered during sterilization without deterioration. One sterilization technique involves exposing solution-filled medical pouches to ethylene oxide at elevated temperatures, e.g., 130° F., for periods of 4 to 12 hours. Another sterilization technique is to bombard solution-filled medical pouches with gamma radiation.

Medical solution pouches must also have sufficient mechanical strength to withstand the abuse which is typically encountered in the use environment. For example, in some circumstances, a plastic or rubber bladder is placed around a medical solution-containing pouch and pressurized to, e.g., 300-400 mm/Hg, in order to force the solution out of the pouch an into a patient. Such a bladder is commonly referred to as a "pressure-cuff" and is used, e.g., when a patient is bleeding profusely in order to quickly replace lost fluids or, e.g., when a patient has high blood pressure such that a greater opposing pressure must be generated in the pouch in order to introduce medical solution into the patient's veins. Medical solution pouches should have sufficient durability to remain leak-free during such procedures.

Another type of medical pouch in which strength and flexibility are of high importance is a "drainage pouch," i.e., a disposable, flexible pouch for the collection of urine or other human waste. A common example of a drainage pouch is an "ostomy pouch." An ostomy pouch is generally worn by a person who has undergone surgery to the excretive system, and serves to collect excretion products from that person. As such, ostomy pouches should be flexible (i.e., soft) and light in weight so that they are comfortable to the wearer, have sufficient strength to contain the excretion products without leakage or rupture, and provide a sufficient barrier to odor that neither the wearer nor others will be able to detect the presence of the ostomy pouch on the wearer. In other applications, drainage pouches desirably have good optical properties so that a medical professional can perform a visual inspection thereof as fluid (e.g., urine) is being collected therein. Such a visual inspection allows the medical professional to determine whether fluid is indeed draining into the pouch, whether blood or sedimentary particles are present in the drainage, the color of the drainage (which indicates, e.g., concentration), etc.

Another medical film application in which flexibility and strength are highly desirably characteristics is a "compression device." A typical compression device is a sleeve-configured bladder made from a flexible film which is placed around the legs of a bedridden patient. The compression devices, and therefore the patient's legs, are sequentially pressurized and depressurized with, e.g., air, to prevent blood from pooling in the legs of the incapacitated patient. The film must be flexible and strong enough to withstand the pressurization/depressurization cycle over an extended period of time.

A further example of the need for strength and flexibility in a multilayer film for medical use is a "thermal blanket." A thermal blanket is a device for regulating the temperature of an incapacitated patient, and generally consists of a blanket-sized flexible film having one or more enclosed water channels extending throughout the blanket. The water channels permit water or other fluid to be circulated through blanket. The blanket is placed over or under the incapacitated patient and the temperature of the circulating water is controlled to maintain the temperature of the incapacitated patient within a predetermined range. The films from which such thermal blankets are made should be as flexible as possible, both for the comfort of the patient and so that the blanket can be made to closely conform to the patient's body.

A film which is commonly used in medical film applications is polyvinyl chloride (PVC). However, PVC is an inherently stiff film. In order to achieve an acceptable level of flexibility, a plasticizer is generally added to the PVC. Unfortunately, the use of plasticizer in medical films can have undesirable effects. For example, when PVC is used to form a medical solution pouch, the plasticizer can migrate from the PVC pouch and into the solution contained within the pouch so that the solution may become contaminated by potentially toxic material. A question has also arisen concerning whether PVC is adequately chemically neutral to medical solutions. Further, it has been found that PVC becomes brittle at relatively low temperatures.

As can be appreciated, a continual need exists in the art for non-PVC medical films having increased strength and flexibility. At the same time, such films must be able to provide the other properties which are necessary for the particular application, e.g., good optical properties, chemical neutrality, strength, heat-sealability, etc.

SUMMARY OF THE INVENTION

A multilayer film in accordance with one aspect of the present invention comprises:

a) a first exterior layer comprising polyurethane; and b) a second exterior layer comprising a material selected from the group consisting of polyurethane, a homopolymer or copolymer of polypropylene, a blend of homopolymer or copolymer of polypropylene and elastomer, high density polyethylene, and mixtures of the foregoing materials.

A multilayer film in accordance with another aspect of the present comprises:

a) a first exterior layer comprising polyurethane;

b) a second exterior layer comprising a material selected from the group consisting of polyurethane, a homopolymer or copolymer of polypropylene, a blend of homopolymer or copolymer of polypropylene and elastomer, high density polyethylene, and mixtures of the foregoing materials; and c) an interior layer positioned between said first and second exterior layers, said interior layer comprising a material selected from the group consisting of a polymeric adhesive, ethylene/alpha-olefin copolymer, polyvinylidene chloride homopolymer and copolymers thereof, and mixtures of the foregoing materials.

Due to the presence of polyurethane in at least one exterior layer of the multilayer films of the present invention, the films advantageously possess a high degree of strength and flexibility. In addition, the polyurethane provides the films with abuse-resistance, temperature-resistance during heat sealing, and excellent optical properties. The films are thus well suited for various packaging or medical applications, such as the medical applications described above.

Definitions

As used herein, the terms "film" and the like refer to a thermoplastic material, generally in sheet or web form, having one or more layers of polymeric materials which may be bonded together by any suitable means well known in the art.

As used herein, the terms "polymer," "polymeric," and the like, unless specifically defined, generally include homopolymers, copolymers, terpolymers, and blends and modifications thereof.

As used herein, the term "polyurethane" and the like refers to the reaction product of an organic isocyanate with compounds containing a hydroxyl group (e.g., a polyester or a polyether). Polyurethanes generally have a —RNHCOOR'— group in their chains.

As used herein, the term "elastomer" and the like refer to a material that, at room temperature, can be stretched repeatedly to at least twice its original length. This characteristic distinguishes plastics from elastomers and rubbers, as well as the fact that elastomers are given their final properties by mastication with fillers, processing aids, antioxidants, curing agents, etc., followed by vulcanization (curing) at elevated temperatures. However, a few elastomers are thermoplastic. Such thermoplastic elastomers include the following preferred materials: styrene-ethylene-butylene-styrene copolymer (SEBS), styrene-butadiene-styrene copolymer (SBS), styrene-isoprene-styrene copolymer (SIS), ethylene-propylene rubber (EPM), and ethylene-propylene-diene-terpolymer (EPDM).

As used herein, the term "ethylene/alpha-olefin copolymer" generally designates copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches. These polymers are obtained by low pressure polymerization processes and the side branching which is present will be short compared to non-linear polyethylenes (e.g., LDPE, a polyethylene homopolymer). Ethylene/alpha-olefin copolymers generally have a density in the range of from about 0.86 g/cc to about 0.94 g/cc, and can be said to fall into two general categories, "heterogeneous" and "homogeneous."

Heterogeneous ethylene/alpha-olefin copolymers are ethylene/alpha-olefin copolymerization reaction products of relatively wide variation in molecular weight and composition distribution, and which are prepared using conventional Ziegler-Natta or other heterogeneous catalysts. Examples of heterogeneous ethylene/alpha-olefins include linear low density polyethylene (LLDPE), linear medium density polyethylene (LMDPE), very low density polyethylene (VLDPE), and ultra-low density polyethylene (ULDPE). LLDPE is generally understood to include that group of heterogeneous ethylene/alpha-olefin copolymers which fall into the density range of about 0.915 to about 0.94 g/cc. Sometimes linear polyethylene in the density range from about 0.926 to about 0.94 is referred to as LMDPE. Lower density heterogeneous ethylene/alpha-olefin copolymers are VLDPE (typically used to refer to the ethylene/butene copolymers available from Union Carbide with a density ranging from about 0.88 to about 0.91 g/cc ) and ULDPE (typically used to refer to the ethylene/octene copolymers supplied by Dow).

Homogeneous ethylene/alpha-olefin copolymers are ethylene/alpha-olefin copolymerization reaction products of relatively narrow molecular weight distribution and relatively narrow composition distribution. Homogeneous ethylene/alpha-olefin copolymers are structurally different from heterogeneous ethylene/alpha-olefin copolymers, in that homogeneous ethylene/alpha-olefins exhibit a relatively even sequencing of comonomers within a chain, a mirroring of sequence distribution in all chains, and a similarity of length of all chains, i.e., a narrower molecular weight distribution. Furthermore, homogeneous ethylene/alpha-olefin copolymers are typically prepared using metallocene, or other single-site type catalysts, rather than using Ziegler Natta catalysts. Such single-site catalysts typically have only one type of catalytic site, which is believed to be the basis for the homgeniety of the polymers resulting from the polymerization. A homogeneous ethylene/alpha-olefin copolymer can be prepared by the copolymerization of ethylene and any one or more alpha-olefin, such as a $C_3$–$C_{20}$ alpha-monoolefin (e.g., 1-butene, 1-pentene, 1-hexene, and 1-octene). Commercially-available examples of homogeneous ethylene/alpha-olefin copolymers include metallocene-catalyzed EXACT™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ resins.

As used herein, the phrase "modified" refers to a polymeric material in which some or all of the substituents are replaced by other materials, providing a change in properties such as improved adhesion. For example, an "anhydride-modified" polymer (e.g., anhydride-modified ethylene/vinyl acetate copolymer) is a polymer which has been chemically modified through grafting techniques to provide anhydride-functionality to the backbone of the polymer. Anhydride-functionality is typically provided by grafting acid anhydrides, e.g., maleic anhydride, succinic anhydride, phthalic anhydride, glutaric anhydride, etc, to the backbone of the modified polymer. The phrase "anhydride-modified" polymer also includes a blend of an unmodified polymer and a polymer modified as described above.

As used herein, the phrase "interior layer" refers to any layer of a multilayer film having both of its principal surfaces directly adhered to another layer of the film.

As used herein, the phrase "exterior layer" refers to any layer of a multilayer film having only one of its principal surfaces directly adhered to another layer of the film. In the multilayer films of the present invention, there are two exterior layers, each of which has a principal surface adhered to only one other layer of the multilayer film. The other principal surface of each of the two exterior layers form the two principal outer surfaces of the multilayer film.

As used herein, the term "adhesive layer" refers to any interior layer having the primary purpose of adhering two layers to one another.

DETAILED DESCRIPTION OF THE PREFERRED EMBODIMENT

Figure 1:
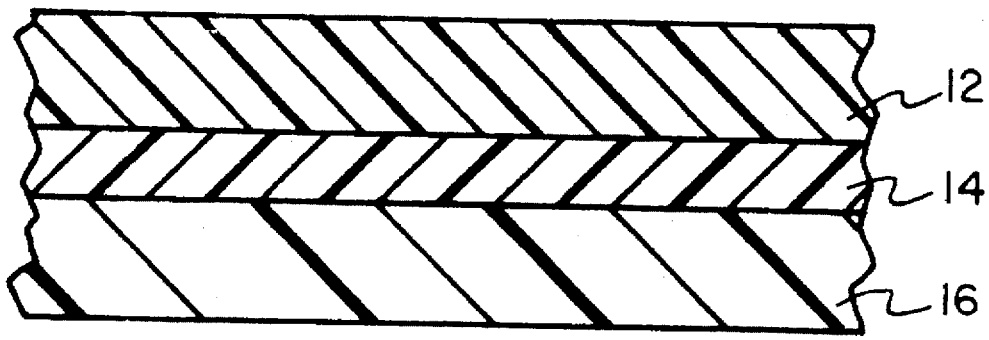
FIG. 1 is a schematic cross-section of a three-layer film in accordance with the present invention.

As discussed previously, the present invention provides a multilayer film which comprises:

a) a first exterior layer comprising polyurethane; and b) a second exterior layer comprising a material selected from the group consisting of polyurethane, a homopolymer or copolymer of polypropylene, a blend of homopolymer or copolymer of polypropylene and elastomer, high density polyethylene,, and mixtures of the foregoing materials.

The use of polyurethane provides the foregoing film structure with a high degree of flexibility and strength, as well as excellent optical properties. Preferably, the polyurethane has a Shore A hardness ranging from about 55 to about 95 and, more preferably, from about 80 to about 90 (ASTM D-2240). Such polyurethanes will typically impart to the films of the present invention an ultimate tensile strength ranging from about 2,800 to about 7,000 psi (ASTM D-412), and an ultimate elongation ranging from about 100 to about 710 percent (ASTM D-412). The actual tensile strength and ultimate elongation values of the film will vary depending upon the particular film structure which is employed.

Preferred polyurethanes include polycaprolactone, polytetramethylene glycol ether, and polyester polyadipate. Suitable, commercially available polyurethanes include PELLETHANE® polyurethane elastomers from Dow Chemical U.S.A., and ESTANE® thermoplastic polyurethanes from BFGoodrich. Polyether-type, as opposed to polyester-type, polyurethanes are preferred.

If desired, the polyurethane may be blended with other materials, such as polyvinyl chloride, polyether block amide copolymer, or copolyester.

When the multilayer film of the present invention is used to form a pouch, such as an I.V. bag, ostomy pouch, or air-bladder portion of a compression device, the first exterior layer preferably forms the outer surface of the pouch (i.e., the surface which is exposed to the environment) while the second exterior layer forms the inner surface of the pouch (i.e., the surface which is in contact with the inside of the pouch and, therefore, with the product, drainage, or air which is enclosed within the pouch). In this fashion, the polyurethane-containing first exterior layer provides the pouch with abuse-resistance, temperature-resistance during heat sealing, and gloss, as well as a high degree of flexibility and strength as noted above. The second exterior layer serves as a sealant layer. In this role, peripheral portions of the second exterior layer are joined, e.g., by heat-sealing, impulse-sealing, or radio frequency (RF) sealing, to form an enclosure.

In the case of heat-sealing, the second exterior layer is either folded upon itself or mated with the sealant layer of another piece of film such that two regions of the second exterior layer are brought into contact with one another and sufficient heat is applied to predetermined, e.g., peripheral, segments of the contacting regions of the second exterior layer that the heated segments become molten and intermix with one another. Upon cooling, the heated segments of the second exterior layer become a single, essentially inseparable layer. In this manner, the heated segments of the second exterior layer produce a liquid-tight closure which is commonly referred to as a heat-seal. The heat-seals thus formed are generally fin-shaped and are linked together to define the peripheral boundaries of the pouch so that, e.g., a medical solution, drainage, or air can be fully enclosed therein.

The choice of material for the second exterior layer is dependent upon the particular application for which the multilayer film of the present invention is to be used. When the multilayer film is to be used to form a pouch as described above, for example, the second exterior layer preferably comprises a blend of homopolymer or copolymer of polypropylene and elastomer. The polyproplylene imparts good heat-resistance to the second exterior layer while the elastomer provides creep- and impact-resistance thereto. Preferably, the elastomer is blended with polypropylene such that the weight percentage of elastomer ranges from about 5 to about 50 (based on the total weight of the second exterior layer). More preferably, the elastomer is present at a weight percentage ranging from about 10 to 40 and, most preferably, from about 10 to 30.

The homopolymer or copolymer of polypropylene is preferably propylene/ethylene copolymer having from about 2 to about 10 percent by weight ethylene and, more preferably, from about 4 to about 6 percent ethylene. A suitable propylene/ethylene copolymer is commercially available from the Fina Oil & Chemical Company under the tradename Z9450, and has an ethylene content of about 6 weight percent. Other commercially available propylene/ethylene copolymers include, e.g., PLTD 665 from Exxon. The polypropylene may, in general, be of any of the available types, i.e., isotactic, syndiotactic, and, less preferably, atactic.

The elastomer may be selected from the group consisting of styrene-ethylene-butylene-styrene block copolymer (SEBS), styrene-butadiene-styrene block copolymer (SBS), styrene-isoprene-styrene block copolymer (SIS), ethylene-propylene rubber (EPM), and ethylene-propylene-diene terpolymer (EPDM). SEBS is commercially available, e.g., from the Shell Chemical Co. as Kraton G-1650, G-1652, and G-1657X. SBS is commercially available, e.g., from Shell as Kraton D-1101, D-1102, D-1300C, D-4122, D-4141, D-4455X, and D-4460X. SIS is commercially available, e.g., from Shell as Kraton D-1107, D-1111, D-1112, and D-1117. EPM is commercially available, e.g., from Exxon as Vistalon 719 or 503. EPDM is commercially available, e.g., from Exxon as Vistalon 3708.

Suitable, pre-prepared blends of polypropylene and elastomer are also commercially available. For example, Z-4650 from Horizon Polymers is a blend of 80 percent by weight Z9450 (propylene/ethylene copolymer as described above) and 20 percent by weight Kraton G-1652 (SEBS as described above).

When the film of the present invention is to be used to form a thermal blanket, the second exterior layer preferably comprises either polyurethane or a blend of propylene/ethylene copolymer and SEBS, depending upon the material from which the tubes are constructed which supply the blanket with water. In general, when such supply tubes are formed from polyurethane, the second exterior layer preferably comprises polyurethane. In this manner, the supply tubes can readily be attached to the thermal blanket via the second (sealant) layer by, e.g., heat sealing. If the tubes have an exterior layer comprising polypropylene or propylene/ethylene copolymer, the second exterior layer preferably comprises a blend of propylene/ethylene copolymer and SEBS.

In a preferred embodiment, the multilayer film of the present invention includes an interior layer positioned between the first and second exterior layers. The interior layer is preferably formed from a material which does not detract from the flexibility imparted to the flexible film by the polyurethane-containing first exterior layer. Depending upon the particular application for which the multilayer film is to be used, the interior layer will preferably provide additional desired properties, e.g., oxygen-barrier functionality, strength, RF sealability, or melt strength. In addition, the core layer can serve to reduce the cost of the film by allowing less polyurethane (a relatively expensive material) to be used in the film structure.

Suitable materials from which the interior layer may be selected include, without limitation, polymeric adhesive, ethylene/alpha-olefin copolymer, polyvinylidene chloride, ethylene/vinyl alcohol copolymer, ethylene/vinyl acetate copolymer, ethylene/methyl acrylate copolymer, ethylene/butyl acrylate copolymer, low density polyethylene, and mixtures of the foregoing materials. Although ethylene/vinyl alcohol copolymer is not as flexible as the other listed materials, it may nevertheless be useful in certain applications.

A polymeric adhesive can be used in the interior layer when the multilayer film is used to make drainage bags, e.g. for urine drainage. Suitable polymeric adhesives for use in the interior layer include, e.g., anhydride-modified ethylene/vinyl acetate (EVA) copolymer, anhydride-modified ethylene/butyl acrylate (EBA) copolymer, anhydride-modified ethylene/methyl acrylate (EMA) copolymer, and anhydride-modified linear low density polyethylene (LLDPE). Such materials are capable of imparting RF sealability and enhanced flexibility to the film.

When the multilayer film of the present invention is used to make medical solution pouches, drainage pouches, or compression devices, ethylene/alpha-olefin (EAO) copolymer, either heterogeneous or homogeneous, is preferably included in the interior layer. The EAO copolymer preferably has a density of less than about 0.92 g/cc and, more preferably, less than about 0.91 g/cc. EAO copolymers are relatively inexpensive (compared to polyurethane) and enhance the flexibility of the film. Examples of suitable heterogeneous EAO copolymers include, without limitation, very low density polyethylenes (VLDPE), such as those sold by Union Carbide under the tradename "FLEXOMER" or those sold by Dow Chemical under the tradename "ATTAIN;" linear low density polyethylene (LLDPE) and linear medium density polyethylene (LMDPE), such as DOWLEX sold by Dow Chemical. Suitable homogeneous EAO copolymers include "EXACT" resins sold by the Exxon Chemical Company, and "AFFINITY" and "ENGAGE" resins sold by Dow Chemical. A particularly preferred homogeneous EAO copolymer is EXACT™ 3028 from Exxon, with a melt index of approximately 1.2 dg/min (ASTM D-1238), a density of approximately 0.90 g/cc (ASTM D-792), and a DSC peak melting point of approximately 92° C.

Polyvinylidene chloride (PVDC) homopolymers and, more preferably, copolymers, are preferred for use in the interior layer when gas-barrier functionality is desired in the multilayer film of the present invention. This would be the case when the film is formed into, e.g., an ostomy-type drainage pouch to prevent odors from escaping the pouch. Suitable PVDC polymers are available from Dow Chemical under the tradename SARAN (e.g., SARAN MA127 and SARAN XO64501-00) and from Solvay (e.g., IXAN PV891).

Referring now to FIG. 1, preferred three-layer film structures in accordance with the present invention will be discussed. Three-layer film 10 includes a first exterior layer 12, a second exterior layer 16, and an interior layer 14 positioned between exterior layers 12 and 16. It should be noted, however, that additional layers, e.g., adhesive layers or barrier layers, may be included in film 10 as desired.

In one embodiment of film 10, first exterior layer 12 comprises polyurethane, interior layer 14 comprises PVDC, and second exterior layer 16 comprises polyurethane. Polyurethane has traditionally been known as a material which does not adhere well to other materials. It has been surprisingly found, however, that polyurethane adheres very well to PVDC. Accordingly, the polyurethane/PVDC/polyurethane film structure can advantageously be used to form a drainage pouch, such as an ostomy pouch. Such a structure combines excellent gas-barrier functionality and strength with a high degree of flexibility. Further, the film can provide the above-properties while being relatively thin, about 2 mils in thickness, as compared to conventional ostomy pouch films, which typically have a film thickness of around 3 mils. Flexibility and thinness are beneficial in that they contribute significantly to the comfort and concealment of an ostomy pouch.

In another embodiment of film 10, first exterior layer 12 comprises polyurethane, interior layer 14 comprises a polymeric adhesive, and second exterior layer 16 comprises polyurethane. Preferably, the polymeric adhesive is an anhydride-modified ethylene/vinyl acetate copolymer (EVA). More preferably, the anhydride-modified EVA has a vinyl acetate content of at least 25 percent by weight. As noted above, polyurethane film layers generally exhibit poor adhesion to other film layers. In addition to finding that polyurethane adheres surprisingly well to PVDC, it has also been unexpectedly found that polyurethane exhibits a high degree of adherence to anhydride-modified EVA, particularly when the vinyl acetate content thereof is at least 25 weight percent. A polyurethane/EVA/polyurethane film would be useful for an RF sealable drainage pouch wherein significant odor-barrier functionality was not of concern (e.g., a urine drainage pouch).

In yet another embodiment of film 10, first exterior layer 12 comprises polyurethane, interior layer 14 comprises a polymeric adhesive, and second exterior layer 16 comprises a blend of propylene/ethylene copolymer and elastomer. Such a film would be useful as the material from which a drainage bag or thermal blanket could be constructed.

Figure 2:
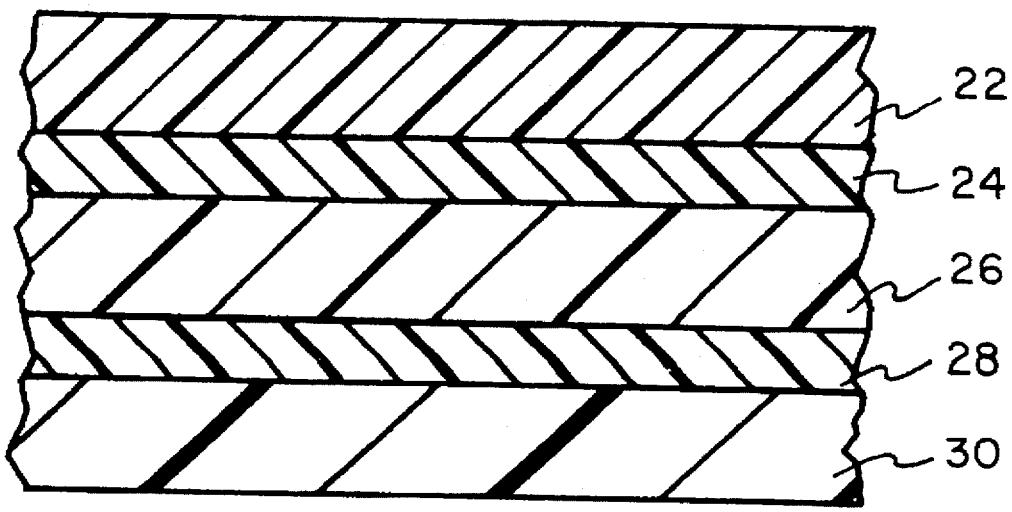
FIG. 2 is a schematic cross-section of a five-layer film in accordance with the present invention.

Referring now to FIG. 2, preferred five-layer film structures in accordance with the present invention will be discussed. Five-layer film 20 includes a first exterior layer 22, a second exterior layer 30, an interior layer 26, an adhesive layer 24 positioned between first exterior layer 22 and interior layer 26, and an adhesive layer 28 positioned between second exterior layer 30 and interior layer 26. First exterior layer 22 corresponds with layer 12 as described above, second exterior layer 30 corresponds with layer 16 as described above, and interior layer 26 corresponds with layer 14 as described above. As with three-layer film 10, additional layers may be added to film 20 as desired.

The total thickness of film 20 may range from about 1 to about 10 mils, but preferably ranges from about 2 mils to about 5 mils. First exterior layer 22 preferably provides from about 10 to about 20 percent, and more preferably about 15 percent, of the total thickness of film 20. Second exterior layer 30 preferably provides from about 10 to about 25 percent, and more preferably about 10 percent, of the total thickness of film 20. The balance of the thickness of film 20 is provided by layers 24, 26, 28, and any other layers which may be included in the film structure.

Adhesive layer 24 may include any suitable adhesive material, such as, e.g., anhydride-modified EVA copolymer, anhydride-modified EMA copolymer, and anhydride-modified EBA copolymer.

Of the foregoing materials, anhydride-modified EVA copolymer is preferred, particularly those in which the vinyl acetate content thereof is 25 weight percent or more. A preferred such material is "BYNEL CXA E-361" from DuPont.

Adhesive layer 28 may comprise a material selected from the group consisting of anhydride-modified EVA copolymer; anhydride-modified ethylene/acrylate copolymer (e.g., anhydride-modified EMA copolymer, anhydride-modified ethylene/ethyl acrylate copolymer, and anhydride-modified EBA copolymer); anhydride-modified ethylene/alpha-olefin (EAO) copolymer (e.g., anhydride-modified linear low density polyethylene and anhydride-modified very low density polyethylene); homogeneous ethylene/alpha-olefin copolymer, particularly those having a density of less than about 0.89 g/cc (e.g., ethylene/octene copolymer); anhydride-modified high density polyethylene; and mixtures of the foregoing materials.

Suitable anhydride-modified EMA copolymers are commercially available from DuPont under the tradename BYNEL™, and from Quantum Chemicals under the tradename PLEXAR™. Anhydride-modified linear low density polyethylene is commercially available from Mitsui under the tradename ADMER™, and from DuPont under the tradename BYNEL™. Each of the other materials which can be used for adhesive layers 24 and 28 are also commercially available.

In one embodiment of multilayer film 20, interior layer 26 comprises an EAO copolymer, preferably a homogeneous EAO copolymer, and second exterior layer 30 comprises a blend of homopolymer or copolymer of polypropylene and elastomer, preferably propylene/ethylene copolymer (PEC) and SEBS. Such a film thus has the structure: polyurethane/ adhesive/homogeneous EAO/adhesive/PEC+SEBS. Adhesive layer 24 preferably comprises anhydride-modified EVA copolymer in which the vinyl acetate content thereof is 25 weight percent or more. Adhesive layer 28 preferably comprises EAO copolymer having a density of less than or equal to 0.89 g/cc. Such a film structure would be particularly useful as a film from which a compression device or thermal blanket is formed, and would also be useful as a film for the manufacture of a medical solution pouch.

As an alternative structure, second exterior layer 30 comprises polyurethane, adhesive layer 28 comprises anhydride-modified EVA copolymer in which the vinyl acetate content thereof is 25 weight percent or more, and layers 22–26 are as described above. Such a film would be useful for the manufacture of thermal blankets, particularly those having polyurethane supply tubes.

As can be appreciated by those having ordinary skill in this art, the multilayer films of the present invention are not limited to the three or five-layer structures described above. Films having fewer or greater numbers of layers, e.g., two, four, six, seven, eight, nine, or more layers, are included within the scope of the present invention. For example, additional high density polyethylene layer(s) may be included in the film in order to increase the moisture barrier capabilities of the film if such an increase is desired. Additional oxygen barrier layer(s) may also be included if desired.

Various additives may used in any or all of the layers of the multilayer films of the present invention. Such additives include, without limitation, antiblocking agents, antioxidants, processing aids such as calcium stearate, pigments, antistatic agents, etc. Where the multilayer film is to be used to for making medical solution pouches, the amount of additive included in the film is preferably kept to a minimum in order to minimize the likelihood that such additives will be extracted into the medical solution.

The multilayer films of the present invention can be formed by cast coextrusion as a tubular film. Containers for medical applications or other end uses can be made directly from the coextruded, tubular film, or alternatively from rollstock material obtained from the tube after it has been slit and ply-separated. A hot blown process can also be used to make the film. When the total film thickness is 4 mils or less, a hot blown process is generally preferred. On the other hand, when the total film thickness is greater than 4 mils, a cast coextrusion process is generally preferred. Other processes, such as extrusion coating, conventional lamination, slot die extrusion, etc., can also be used to make the multilayer film of the present invention, although these alternative processes can be more difficult or less efficient than the above methods.

Multilayer films in accordance with the present invention may be cross-linked, depending upon the application in which such films are utilized. Cross-linking increases the structural strength of the film at elevated temperatures and/or increases the force at which the material can be stretched before tearing apart. Cross-linking is preferably done by irradiation, i.e., bombarding the film with particulate or non-particulate radiation such as high-energy electrons from an accelerator or cobalt-60 gamma rays, to cross-link the materials of the film. A preferred irradiation dosage level is in the range of from about 2 megarads (M.R.) to about 12 M.R. Any conventional cross-linking technique may be used. For example, electronic cross-linking may be carried out by curtain-beam irradiation. Chemical cross-linking techniques may also be employed, e.g., by the use of peroxides.

Pouches made by the multilayer films of the present invention, e.g., I.V. bags, drainage pouches, or compression devices, may be sealed by various means well known in the art, including impulse, radio-frequency, and hot-bar sealing. An example of a commercially available impulse-type sealing device is a Vertrod™ heat sealer. The heat-seals which form the top and bottom of the pouch (generally shorter in length than the sides of the pouch) are preferably formed in the machine direction of the multilayer film (i.e., the direction in which the film moved through the production equipment), verses the transverse direction (which is perpendicular to the machine direction).

The multilayer films of the present invention have been described in connection with medical applications. However, it is to be understood that other applications for the films are also possible, and that this disclosure should not be construed as being limited only to medical pouches or devices.

The invention may be further understood by reference to the following examples, which are provided for the purpose of representation, and are not to be construed as limiting the scope of the invention.

EXAMPLES

The films produced in Examples 1–7 were hot blown. The film of Example 8 was cast coextruded. The materials used in the films are identified below. All percentages are weight percents unless indicated otherwise. All physical property and compositional values are approximate unless indicated otherwise.

"PU-1": PELLETHANE PU2102-90AE (TM); a polyether polyurethane elastomer from Dow Chemical having a Shore A hardness of 94, an ultimate tensile strength of 5900 psi, and an ultimate elongation of 500%.

"PU-2": PELLETHANE PU2355-95AE (TM); a polyether polyurethane elastomer from Dow Chemical having a Shore A hardness of 94, an ultimate tensile strength of 5200 psi, and an ultimate elongation of 480%.

"ADHESIVE-1": BYNEL CXA E-361 (TM); an anhydride-modified EVA copolymer having a vinyl acetate content of 25 weight percent; available from DuPont.

"ADHESIVE-2": ENGAGE EG 8150 (TM); a homogeneous ethylene/octene copolymer having a density of 0.87 g/cc; available from Dow Chemical.

"VLDPE-1": DEFD 1015 (TM); a very low density polyethylene from Union Carbide Chemicals and Plastics Company, Inc.

"VLDPE-2": DOW XU-58000.00 (TM); a very low density polyethylene from Dow Chemical.

"EAO-1": EXACT SLP 3010D (TM); a homogeneous ethylene/alpha-olefin copolymer having a density of 0.91 g/cc; available from Exxon Chemical Co.

"EAO-2": EXACT 3028 (TM); a homogeneous ethylene/alpha-olefin copolymer having a density of 0.90 g/cc; available from Exxon Chemical Co.

"PEC-1": PLTD 665 (TM); a propylene/ethylene copolymer from the Exxon Chemical Company.

"PEC-2": Z9450 (TM); a propylene/ethylene copolymer having a melt flow index of 5 g/10 min.; available from the Fina Oil & Chemical Company.

"PEC-3": Z9550 (TM); a propylene/ethylene copolymer having a melt flow index of 10 g/10 min.; available from the Fina Oil & Chemical Company.

"SEBS": KRATON G-1652 (TM); a styrene-ethylene-butylene-styrene block copolymer from the Shell Chemical Co.

"SARAN": SARAN PVDC (TM); a polyvinyl chloride copolymer available from Dow Chemical.

Example 1

A multilayer film in accordance with the present invention had the following 5-layer structure, with each layer being listed in the same order in which it appeared in the film:

| First exterior (abuse) layer: | PU-1 |
| Adhesive layer: | ADHESIVE-1 |
| Interior (core) layer: | VLDPE-1 |
| Adhesive layer: | ADHESIVE-1 |
| Second exterior (seal) layer: | PU-1 |

Example 2

A multilayer film in accordance with the present invention had the following 5-layer structure, with each layer being listed in the same order in which it appeared in the film:

| First exterior (abuse) layer: | PU-2 |
| Adhesive layer: | ADHESIVE-1 |
| Interior (core) layer: | VLDPE-1 |
| Adhesive layer: | ADHESIVE-1 |
| Second exterior (seal) layer: | PU-2 |

Example 3

A multilayer film in accordance with the present invention had the following 5-layer structure, with each layer being listed in the same order in which it appeared in the film:

| First exterior (abuse) layer: | PU-1 |
| Adhesive layer: | ADHESIVE-1 |
| Interior (core) layer: | EAO-1 |
| Adhesive layer: | ADHESIVE-2. |
| Second exterior (seal) layer: | 80% PEC-1 + 20% SEBS |

Example 4

A multilayer film in accordance with the present invention had the following 5-layer structure, with each layer being listed in the same order in which it appeared in the film:

| First exterior (abuse) layer: | PU-1 |
| Adhesive layer: | ADHESIVE-1 |
| Interior (core) layer: | EAO-2 |
| Adhesive layer: | ADHESIVE-2 |
| Second exterior (seal) layer: | 80% PEC-1 + 20% SEBS |

Example 5

A multilayer film in accordance with the present invention had the following 5-layer structure, with each layer being listed in the same order in which it appeared in the film:

| | |
|---|---|
| First exterior (abuse) layer: | PU-1 |
| Adhesive layer: | ADHESIVE-1 |
| Interior (core) layer: | VLDPE-2 |
| Adhesive layer: | 50% VLDPE-2 + 50% PEC-2 |
| Second exterior (seal) layer: | 80% PEC-3 + 20% SEBS |

Example 6

A multilayer film in accordance with the present invention had the following 5-layer structure, with each layer being listed in the same order in which it appeared in the film:

| | |
|---|---|
| First exterior (abuse) layer: | PU-1 |
| Adhesive layer: | ADHESIVE-1 |
| Interior (core) layer: | VLDPE-1 |
| Adhesive layer: | 50% VLDPE-1 + 50% PEC-2 |
| Second exterior (seal) layer: | 80% PEC-1 + 20% SEBS |

Example 7

A multilayer film in accordance with the present invention had the following 9-layer structure, with each layer being listed in the same order in which it appeared in the film:

| | |
|---|---|
| First exterior (abuse) layer: | PU-1 |
| Adhesive layer: | ADHESIVE-1 |
| First interior layer: | VLDPE-1 |
| Second interior layer: | VLDPE-1 |
| Third interior layer: | VLDPE-1 |
| Fourth interior layer: | VLDPE-1 |
| Fifth interior layer: | VLDPE-1 |
| Adhesive layer: | ADHESIVE-1 |
| Second exterior (seal) layer: | 80% PEC-3 + 20% SEBS |

Example 8

A multilayer film in accordance with the present invention had the following 3-layer structure, with each layer being listed in the same order in which it appeared in the film:

| | |
|---|---|
| First exterior (abuse) layer: | PU-2 |
| Interior (core) layer: | SARAN |
| Second exterior (seal) layer: | PU-2 |

Example 9

A multilayer film in accordance with the present invention has the following 3-layer structure, with each layer being listed in the same order in which it appears in the film:

| | |
|---|---|
| First exterior (abuse) layer: | PU-1 |
| Interior (core) layer: | ADHESIVE-1 |
| Second exterior (seal) layer: | PU-1 |

While the invention has been described with reference to illustrative examples, those skilled in the art will understand that various modifications may be made to the invention as described without departing from the scope of the claims which follow.

What is claimed is:

1. A multilayer film, comprising:
   a) a first exterior layer comprising polyurethane;
   b) a second exterior layer comprising a blend of homopolymer or copolymer of polypropylene and elastomer; and
   c) an interior layer, positioned between said first and second exterior layers, comprising ethylene/alpha-olefin copolymer.

2. The multilayer film of claim 1, wherein said polyurethane has a Shore A hardness ranging from about 55 to about 95.

3. The multilayer film of claim 2, wherein said polyurethane has a Shore A hardness ranging from about 80 to about 90.

4. The multilayer film of claim 1, further including an adhesive layer positioned between said interior layer and said first exterior layer.

5. The multilayer film of claim 4, wherein said adhesive layer comprises anhydride-modified ethylene/vinyl acetate copolymer.

6. The multilayer film of claim 5, wherein said anhydride-modified ethylene/vinyl acetate copolymer has a vinyl acetate content of at least 25 weight percent.

7. The multilayer film of claim 1, further including an adhesive layer positioned between said interior layer and said second exterior layer.

8. The multilayer film of claim 7, wherein said adhesive layer comprises a material selected from the group consisting of anhydride-modified ethylene/vinyl acetate copolymer, anhydride-modified ethylene/acrylate copolymer, anhydride-modified ethylene/alpha-olefin copolymer, homogeneous ethylene/alpha-olefin copolymer, anhydride-modified high density polyethylene, and mixtures of the foregoing materials.

9. A pouch for the packaging and administration of medical solutions, said pouch formed from the multilayer film of claim 1.

10. A pouch for the collection of human drainage, said pouch formed from the multilayer film of claim 1.

11. A compression device formed from the multilayer film of claim 1.

12. A thermal blanket formed from the multilayer film of claim 1.

13. A multilayer film, comprising:
   a) a first exterior layer comprising polyurethane;
   b) a second exterior layer comprising polyurethane; and
   c) an interior layer, positioned between said first and second exterior layers, comprising ethylene/alpha-olefin copolymer.

14. The multilayer film of claim 13, wherein said polyurethane has a Shore A hardness ranging from about 55 to about 95.

15. The multilayer film of claim 14, wherein said polyurethane has a Shore A hardness ranging from about 80 to about 90.

16. The multilayer film of claim 13, further including an adhesive layer positioned between said interior layer and said first exterior layer.

17. The multilayer film of claim 16, wherein said adhesive layer comprises anhydride-modified ethylene/vinyl acetate copolymer.

18. The multilayer film of claim 17, wherein said anhydride-modified ethylene/vinyl acetate copolymer has a vinyl acetate content of at least 25 weight percent.

19. The multilayer film of claim 13, further including an adhesive layer positioned between said interior layer and said second exterior layer.

20. The multilayer film of claim 10, wherein said adhesive layer comprises a material selected from the group consisting of anhydride-modified ethylene/vinyl acetate copolymer, anhydride-modified ethylene/acrylate copolymer, anhydride-modified ethylene/alpha-olefin copolymer, homogeneous ethylene/alpha-olefin copolymer, anhydride-modified high density polyethylene, and mixtures of the foregoing materials.

21. A thermal blanket formed from the multilayer film of claim 13.

* * * * *